United States Patent Office 2,894,976
Patented July 14, 1959

2,894,976

BICYCLOHEPTENE CARBOXYLATES AND THEIR PRODUCTION

Fred W. Banes, Westfield, and Herbert K. Wiese, Cranford, N.J., assignors to Esso Research and Engineering Company, a corporation of Delaware No Drawing. Application April 1, 1955
Serial No. 498,749

13 Claims. (Cl. 260—468)

This invention relates to polyfunctional derivatives of cyclodiene carboxylic acids and to their preparation. More particularly the invention relates to carboxylic compounds obtained by reacting a dicyclopentadiene dicarboxylic acid with various unsaturated compounds such as styrene, butadiene, acrolein, methyl vinyl ketone, tung oil, and so forth.

Dicyclopentadiene dicarboxylic acids and their preparation have been described previously in copending application of Cohen et al., Serial No. 268,122, filed January 24, 1952, issued as Patent 2,716,662; reissued as Re. 24,123. Such acids are in effect dimers of the corresponding monocyclodiene monocarboxylic acids.

It is well known that dicyclodiene hydrocarbons can be depolymerized into isolatable monomers. For example, dicyclopentadiene can be depolymerized to cyclopentadiene monomers which can be isolated and used for preparing other derivatives of polymers thereof. Although a cyclodiene monocarboxylic acid monomer is a very desirable intermediate for producing valuable derivatives, it has been found impossible to isolate such a monocarboxylic acid monomer by depolymerizing a dicyclodiene dicarboxylic acid. When attempting to depolymerize a dicyclodiene dicarboxylic acid to a monomer by heating, as is done in the case of a dicyclodiene hydrocarbon, the dicarboxylic acid either decarboxylates or resinifies or both.

It has now been found that derivatives of a cyclodiene monocarboxylic acid monomer can be readily obtained by heating a dimeric dicyclodiene dicarboxylic acid in the presence of a suitable unsaturated, dienophilic compound. That is, although it is impossible to depolymerize a dicyclodiene dicarboxylic acid by itself, it is possible to shift the equilibrium to the monocarboxylic acid monomer whenever a reactive dienophilic compound is present to react with the monomer acid as soon as it is produced.

Accordingly, the principal reagent used in carrying out the present invention is a dicyclodiene dicarboxylic acid such as dicyclopentadiene dicarboxylic acid having the formula:

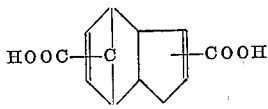

Other dicarboxylated dicyclodiene compounds suitable for the present purposes are dimethyl dicyclopentadiene dicarboxylic acid, i.e., the dicarboxylated dimer of methylcyclopentadiene, or methyl dicyclopentadiene dicarboxylic acid, i.e., the mixed dimer of cyclopentadiene carboxylic acid and methyl cyclopentadiene carboxylic acid. The corresponding alkyl esters, e.g. the dimethyl ester of dicyclopentadiene dicarboxylic acid can be used likewise.

The other essential reagent used in the present invention is a reactive unsaturated dienophilic compound such as an unsaturated ketone or aldehyde, a conjugated diene or other reactive unsaturated hydrocarbon, nitriles of unsaturated acids, or triglycerides of unsaturated acids. Representative compounds include vinyl ketones such as methyl vinyl ketone; acrolein, crotonaldehyde and other aldehydes containing a double bond adjacent to the carbonyl group; allyl alcohol, cinnamyl alcohol and similar unsaturated alcohols; conjugated dienes such as isoprene, butadiene-1,3, piperylene or chlorinated derivatives such as chloroprene; vinyl compounds such as styrene, acrylonitrile, methacrylonitrile, vinyl chloride, vinylidene chloride; and triglyceride esters of unsaturated aliphatic acids such as oleic, linoleic, eleostearic or linolenic acid either in substantially pure form or in the form of vegetable or animal oils such as tung oil, linseed oil, soybean oil, menhadden oil, etc.

Broadly the depolymerization and reaction with dienophilic compounds to produce derivatives of bicycloheptene containing at least one carboxyl group can be depicted as follows:

(1) DEPOLYMERIZATION OF DIMER ACID

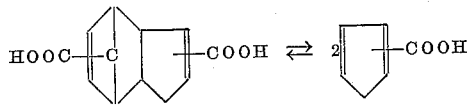

(2) REACTION OF MONOMER ACID WITH UNSATURATED DIENOPHILE

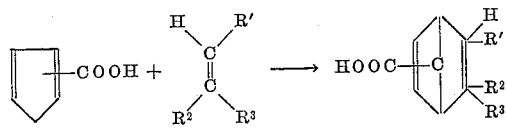

As a result, valuable derivatives of bicycloheptene are obtained which contain at least one carboxyl group and wherein R′=H, aryl ($\phi, \phi CH_3$, etc.), alkyl ($CH_3$, $C_2H_5$, etc.); $R^2$=H, COOH, COOR, CHO,

CN, Cl, aryl; $R^3$=H, $CH_2COOH$, R ($CH_3$, $C_2H_5$, $CH:CH.CH_3$, etc.). Since reactions of the above type have normally been found to be quantitative, it is advantageous to use the reagents in stoichoimetric proportions, that is, one mole of the dimeric dicyclodiene dicarboxylic acid per two moles of the unsaturated dienophilic compound. However, an excess of one or the other reagent may be present if desired for any special reason, e.g. to serve as a diluent. No catalyst is required.

The reaction is carried out satisfactorily by heating the reaction mixture at a temperature sufficiently high to produce the monomeric cyclodiene monocarboxylic acid by cracking or depolymerization of the dicyclodiene dicarboxylic acid. Suitable reaction temperatures are in the range of about 75° to 250° C., preferably 135° to 190° C. Below about 100° C. the reaction tends to become slow due to the low rate of depolymerization and consequent small availability of the required monomeric acid. On the other hand at temperatures above 190° C. decarboxylation of the dicyclodiene dicarboxylic acid and resinification become increasingly noticeable.

The reaction pressure depends on the nature of the reaction ingredients used and on the temperature of reaction. Accordingly, the process of the invention may be conveniently conducted at pressures ranging from atmospheric or slightly subatmospheric to moderately elevated pressures such as 10 or 50 p.s.i.g. The reaction is a rapid one and can normally be completed in about 5 to 120 minutes, reaction times of about 10 to 60 minutes commonly being satisfactory. The reaction can be carried out either batchwise or in a continuous manner.

The reaction is suitably controlled by refluxing a solvent medium such as xylenes, straight run mineral spirits (Varsol), nonanes, decanes, propionic acid, and other liquids which are substantilly inert in the reaction mixture and boil in the desired reaction temperature range when under suitable pressure. About 2 to 10 parts by weight of such a liquid per part by weight of cyclodiene carboxylic acid are convenient to use. However, the reaction can be conducted without any solvent, using other temperature control means. Nevertheless, use of the solvent is beneficial since it improves contact between the reagents and usually tends to promote depolymerization of the dimeric acid.

Examples illustrative of the scope and operation of the invention are summarized in Tables I and II. It will be understood that all amounts, ratios, and percentages of materials are expressed on a weight basis throughout this specification and in the appended claims, unless otherwise indicated.

Table I illustrates some of the principal reactions carried out in accordance with the present teaching and shows the types of products obtainable.

*Table I.—Reaction of dicyclopentadiene dicarboxylic acid with various dienophilic compounds to produce derivatives of dicyclo (2,2,1) hept-5-ene containing at least one carboxyl group*

I.

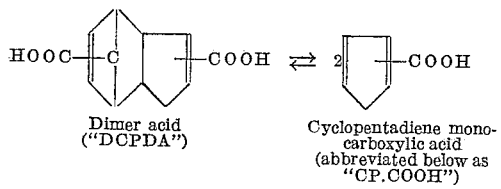

Dimer acid ("DCPDA") ⇌ 2 Cyclopentadiene monocarboxylic acid (abbreviated below as "CP.COOH")

II-A

CP.COOR$^a$ + Acrolein ⟶ HOOC

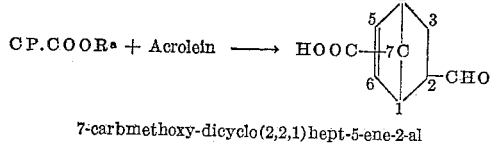

7-carbmethoxy-dicyclo(2,2,1)hept-5-ene-2-al

The product was later hydrogenated to obtain 7-carbmethoxy-dicyclo (2,2,1) heptan-2-ol.

II-B

CP.COOH + Crotonaldehyde ⟶ HOOC

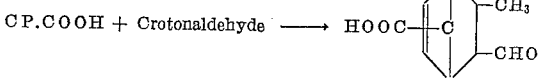

3-methyl-7-carboxy-dicyclo(2,2,1)hept-5-ene-2-al

II-C

CP.COOH + Styrene ⟶ HOOC

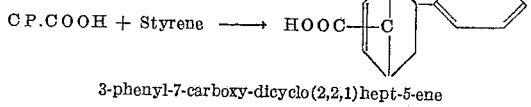

3-phenyl-7-carboxy-dicyclo(2,2,1)hept-5-ene

II-D

CP.COOH + Isoprene ⟶ HOOC

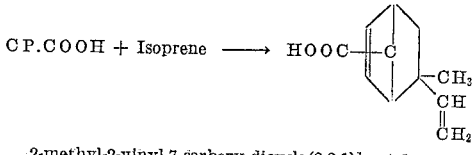

2-methyl-2-vinyl-7-carboxy-dicyclo(2,2,1)hept-5-ene

II-E

CP.COOH + Eleostearic Acid$^b$ ⟶

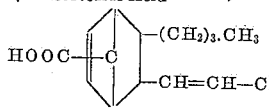

Triglyceride of 3-butyl-7-carboxy-dicyclo(2,2,1)-hept-5-ene-2-dodecadien-8,10 oic acid $^a$ Used the dimethyl ester of dicyclopentadiene dicarboxylic acid.
$^b$ Used in the form of a glyceride present in tung oil.

Table II gives a detailed summary of several typical runs wherein dicyclopentadiene dicarboxylic acid, hereafter abbreviated as "DCPDA," was reacted with various dienophilic compounds under specified conditions. The reactions were conducted at atmospheric pressure in an agitated reactor.

*Table II.—Reaction of dicyclopentadiene dicarboxylic acid with various dienophiles*

| Run No | 65 | 61 | 133 | 103 |
|---|---|---|---|---|
| Charge: | | | | |
| DCPDA, gm | 20 | 20 | 90 $^f$ | 25. |
| Other Reagent, gm | Styrene, 97.5 | tung oil,$^d$ 5 | Acrolein, 75 | Crotonaldehyde, 21 |
| Solvent, ml | none | none | none | 150—xylene. |
| Conditions: | | | | |
| Max. Temp., °C | 130–140 | 180 | 165 | 165. |
| Time at Max. Temp., min | 45 | 15 | 15 | 15. |
| Recovered, gm | 25 $^b$ | 25 $^e$ | 146 $^g$ | 31 $^b$. |
| Yield, Mole, percent, and Based on DCPDA | 64.5 $^c$ | 100 | 98 $^h$ | 76. |
| | | | 75 $^h$ | |
| Analysis of Product: | | | | |
| Acid No., meq./gm.$^a$ | 5.43 (4.67) | 1.75 (1.82) | 0.00 (0.00) $^h$ | 5.70 (5.55).$^i$ |
| Carbonyl No., meq./gm.$^a$ | | | Trace (0.00) | 1.73 (5.55).$^j$ |
| Hydroxyl No., meq./gm.$^a$ | | | 4.94 (5.43) | 4.81 (0.00).$^j$ |
| Sap. No., meq./gm.$^a$ | | | 5.43 (5.43) | |
| Molecular Weight $^a$ | 221 (214) | | | |
| Appearance | Viscous Liquid | Viscous Liquid | Liquid | Solid. |
| Br$_2$ No., meq. Br$_2$/gm.$^a$ | 4.91 (4.67) | | | |

$^a$ Figures in parenthesis represent theoretical values.
$^b$ Products worked up by dissolving adduct in aqueous K$_2$CO$_3$ followed by extraction with petroleum ether and springing adduct with 50% H$_2$SO$_4$.
$^c$ The remaining 35.5% was converted to copolymer with styrene.
$^d$ Reaction with eleostearic acid present as glyceride in tung oil. About 73.0% of fatty acids present in tung oil consist of eleostearic acid.
$^e$ Occurence of reaction evidenced by failure of insoluble DCPDA to precipitate out on cooling reaction mixture and formation of emulsion during titration of same.
$^f$ Used the dimethyl ester of same.
$^g$ Product recovered after hydrogenation of adduct to saturate double bond and convert aldehyde group to hydroxyl group. Excess acrolein removed prior to hydrogenation. Used Raney nickel as catalyst at 150° C. and 2000 p.s.i.g. H$_2$. Distillation of hydrogenated product yielded 10.3% front ends, 66.1% heart cut and 33.9% residue which includes hold up of column.
$^h$ Based on heart cut (see ($^g$)).
$^i$ C, H, O values: found, 64.1% C, 29.1% O, 6.8% H. Theoretical values: 66.6% C, 26.7% O, 6.7% H.
$^j$ Low carbonyl number and the presence of hydroxyl groups indicates the presence of oxylactone (hemi acetal) group formed from the carboxyl and aldehyde group present in the same molecule.

Since the obtained carboxylated bicycloheptene derivatives contain at least one double bond, they can undergo many reactions such as oxonation, epoxidation, halogenation, hydroxylation, hydrogenation and addition of thiol compounds such as thioglycolic or thiosalicylic acid. Consequently, the products of the invention represent valuable starting materials for a wide variety of organic reactions. For instance, adducts containing a formyl group can be oxidized to an acid, or reduced to an unsaturated or saturated alcohol, depending on hydrogenation conditions. A reduction of the latter type was carried out in connection with run No. 133 as described in footnote (g) of Table II. The resulting materials of the type represented by the resulting product contain both a hydroxyl and a carboxyl group and can be used in making polyester-type synthetic lubricants, resins, in modifying natural drying oils, and the like. Other uses include the preparation of agricultural chemicals. Some of the chlorinated carboxylated derivatives, in particular, have pesticidal properties and can be used as such, or as alkyl esters, or in the form of salts of metals such as copper, mercury, lead, or the like.

The described invention is claimed as follows:

1. A dicycloheptene derivative which comprises an adduct of a cyclopentadiene derivative selected from the group consisting of cyclopentadiene monocarboxylic acid, methylcyclopentadiene monocarboxylic acid, and the methyl esters thereof, and an unsaturated dienophilic compound having the formula

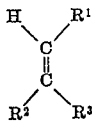

wherein R' is selected from the group consisting of hydrogen and alkyl and aryl radicals; $R^2$ is selected from the group consisting of hydrogen, carboxyl, carbalkoxyl, formyl, alkylformyl, cyano, chlorine and aryl radicals; and $R^3$ is selected from the group consisting of hydrogen, carboxyl, carboxyalkenyl, carboxyalkadienyl, aryl, alkyl, and alkylene radicals.

2. An adduct according to claim 1 wherein the dienophilic compound is a glyceride of an unsaturated aliphatic monocarboxylic acid.

3. An adduct according to claim 1 wherein the dienophilic compound is a glyceride of an octadecadienoic acid.

4. An adduct according to claim 1 wherein the dienophilic compound is a vinyl substituted hydrocarbon.

5. A carboxy-dicyclo (2,2,1)-hept-5-ene-2-al.

6. Carbmethoxy-dicyclo(2,2,1)-heptan-2-ol.

7. A process for preparing carbmethoxy-dicyclo (2,2,1) heptan-2-ol which comprises mixing one mole of the dimethyl ester of dicyclopentadiene dicarboxylic acid with about two moles of acrolein, refluxing the mixture in an inert liquid solvent at a temperature in the range of 135° to 190° C. and a pressure between about atmospheric and 50 p.s.i.g., contacting the resulting carbmethoxy-dicyclo (2,2,1) hept-5-ene-2-al with sufficient hydrogen over a hydrogenation catalyst at a sufficient temperature and pressure to saturate the double bond and convert the aldehyde group to an alcohol group, and recovering the product carbmethoxy-dicyclo (2,2,1) heptan-2-ol.

8. A process of preparing a carboxylated dicycloheptene derivative which comprises mixing a dicarboxylated dicyclopentadiene with an unsaturated dienophilic compound having the formula

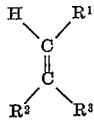

wherein R' is selected from the group consisting of hydrogen and alkyl and aryl radicals; $R^2$ is selected from the group consisting of hydrogen, carboxyl, carbalkoxyl, formyl, alkylformyl, cyano, chlorine and aryl radicals; and $R^3$ is selected from the group consisting of hydrogen, carboxyl, carboxylalkenyl, carboxyalkadienyl, aryl, alkyl, and alkylene radicals and heating the mixture at a temperature between about 75° and 250° C.

9. A process according to claim 8 wherein the dicarboxylated dicyclodiene is selected from the group consisting of dicyclopentadiene dicarboxylic acid, dimethyldicyclopentadiene dicarboxylic acid, methyldicyclopentadiene dicarboxylic acid, and alkyl esters thereof.

10. A process according to claim 9 wherein the dienophilic compound is selected grom the group consisting of unsaturated aldehydes, vinyl substituted hydrocarbons, and triglycerides of octadecadienoic acids.

11. A process of preparing a carboxylated dicycloheptene derivative which comprises mixing the methyl ester of dicyclopentadiene dicarboxylic acid with a molecular excess of acrolein and heating the resulting mixture at a temperature between about 135° and 190° C.

12. A process of preparing a carboxylated derivative of dicycloheptene which comprises mixing dicyclopentadiene dicarboxylic acid with a vegetable drying oil and heating the mixture at a temperature of about 135° to 190° C.

13. A process according to claim 12 wherein the vegetable oil is tung oil.

References Cited in the file of this patent
UNITED STATES PATENTS

| | | |
|---|---|---|
| 2,415,453 | Thomas | Feb. 11, 1947 |
| 2,688,627 | Cohen et al. | Sept. 7, 1954 |
| 2,716,662 | Cohen et al. | Aug. 30, 1955 |